Dec. 29, 1925.

W. A. DEAN

HUB

Filed Feb. 12, 1925

1,567,638

Inventor:
William A. Dean,
by Emery, Booth, Janney & Varney
Attys.

Patented Dec. 29, 1925.

1,567,638

UNITED STATES PATENT OFFICE.

WILLIAM A. DEAN, OF WORCESTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

HUB.

Application filed February 12, 1925. Serial No. 8,732.

*To all whom it may concern:*

Be it known that I, WILLIAM A. DEAN, a citizen of the United States, and a resident of Worcester, county of Worcester, State of Massachusetts, have invented an Improvement in Hubs, of which the following description, in connection with the accompanying drawings, is a specification, like characters on the drawings representing like parts.

This invention relates to hubs and the particular object is to provide a hub having an inner non-rotating part and an outer rotating part, as is necessary, for example, in ball bearing wheels. I aim to provide such a hub suitable for use on light vehicles as baby carriages.

My invention will best be understood by reference to the following description of an illustrative embodiment thereof shown by way of example in the accompanying drawings, wherein.

Figure 1:
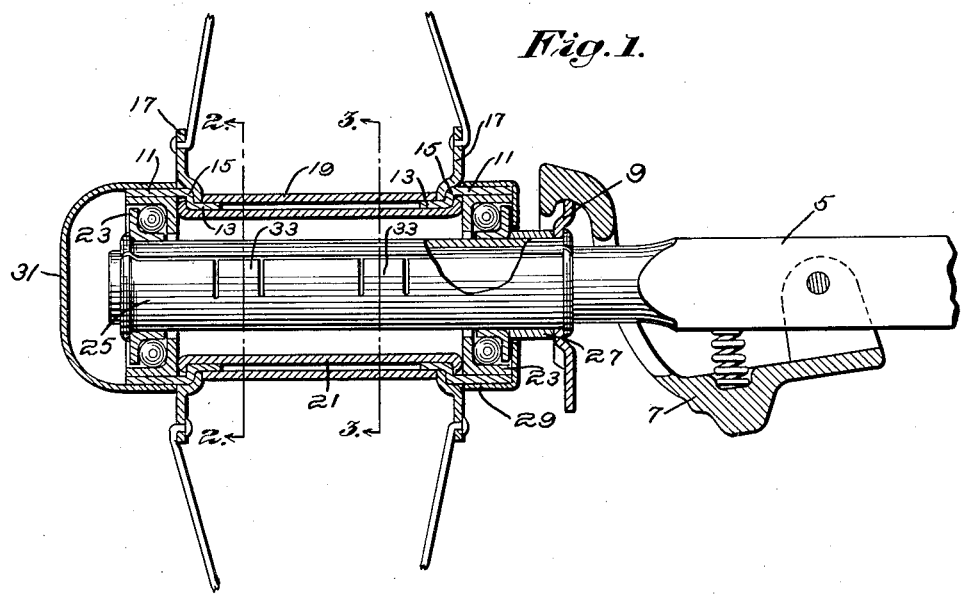
Fig. 1 is a central longitudinal section through the hub.

The example of my invention shown by way of illustration in the drawings is a wire spoke wheel of a quick removable type adapted to be held on the axle 5 by means of a latch 7 cooperating with a flange 9 carried by the wheel hub. This method of attaching a wheel to an axle is fully disclosed in Patent No. 597,315, Jan. 11, 1895, to Stillman Day, to which reference is made for a more complete understanding of the construction.

The hub shown is one adapted to be constructed cheaply and expeditiously from sheet metal, the parts being readily assembled and easily secured together in their assembled relation. Referring to the drawings, in the construction there illustrated I may utilize two annuli 11 having reduced portions 13 presented one towards the other and providing the radial shoulders 15. The spoke-receiving portion of the hub may be seated against the outer or adjacent faces of these radial shoulders and be confined thereby and in the embodiment of the invention shown this portion comprises the spoke-receiving disks 17 seated against the shoulders and held spaced by an interposed sleeve 19. To secure the parts in position a sleeve 21 may fit the reduced portions of the annuli and suitable means are provided at the ends of this sleeve cooperating with the inner or distal faces of the radial shoulders 15 for clamping together the parts. Preferably, as herein shown, the ends of the sleeve 21 are flanged over or upset on these faces of the shoulders.

The larger portions of the annuli 11 distally of the shoulders provide seats for anti-friction bearings 23 herein shown as ball bearings of conventional form, the outer ball races being seated in the ends of the annuli 11. Supported by the inner races of the ball bearings is the non-rotating part of the hub which may comprise a sleeve 25 which is conveniently secured in position and in turn retains the ball bearings in position by having its ends upset as indicated in Fig. 1. As shown in that figure, the left hand end of the sleeve is upset directly upon the inner race of the ball bearing at the left while the right hand end retains the ball bearing through the medium of a spacing sleeve 27 surrounding the sleeve 25 and interposed between the inner race of the ball bearing and the retaining flange 9 which itself is secured in position by the upset end of the axle-receiving sleeve 25.

The inner ball race at the right of the figure may be protected from access of dirt by means of the cap 29 conveniently slipped on over the spacing sleeve 27 before the flange 9 is applied and the outer ball bearing may be protected by the cap 31 fitting over the outer annulus 11.

Figure 2:
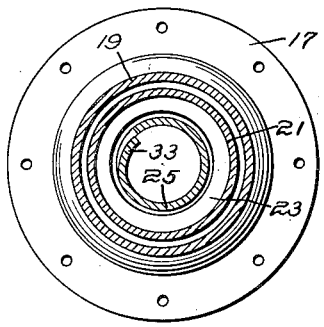
Fig. 2 is a section on the line 2—2 of Fig. 1 with the axle removed.
Figure 3:
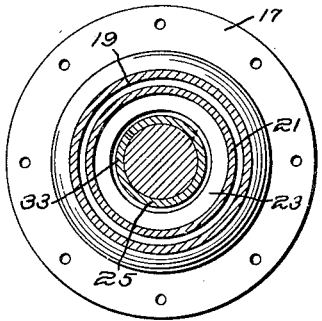
Fig. 3 is a section on the line 3—3 of Fig. 1.

If the ball bearings are to function, the sleeve 25 should be non-rotatably held on the axle 5. At the same time and more particularly in the case of a removable wheel held on by such a device as the latch 7, it should not fit so tightly but that it can be readily drawn off when the latch is released. For this purpose and to prevent any play of the parts which might cause disagreeable noise suitable resilient means may be provided which will bind against the axle 5 when the latter is inserted in position in the sleeve 25 and secure the two together. In the preferred form of my invention illustrated this is provided for by striking inwardly from the sleeve 25 tongues 33 so that they will normally have the position shown in Fig. 2 when the axle 5 is not in position. When the axle is inserted the tongues 33 are pressed outwardly to the position shown in Fig. 3 but through the resiliency of the material they press against the axle 5 and effectually bind the sleeve 25 thereon in such manner that rotation will take place between the two races of the ball bearing and not between the sleeve and the axle.

Referring to Fig. 1 of the drawings, it will be seen that the parts of the hub there disclosed may be very simply fashioned from sheet metal and may be conveniently assembled and secured together. For instance, the two disks 17 are placed against the ends of the sleeve 19 and the reduced portions 13 of annuli 11 inserted in the ends of the sleeve. The sleeve 21, which may be already flanged at one end, may then be inserted in position and the other end upset to bind together the outer or rotating portion of the hub. The ball bearings may then be inserted in the larger ends of the annuli and the cap 29 placed in position. The spacing sleeve 27 and flange 9 may be assembled with the sleeve 25 and the latter placed in position and the outer end thereof upset to bind together all the parts of the hub in a permanent whole.

I have described in considerable detail the particular embodiment of my invention shown by way of example in the accompanying drawings. The particularity of the description has had for its object making clear the construction illustrated and has not been intended as a limitation of the invention to the mechanical construction thus described in detail. Obviously the construction may be varied widely without departing from the spirit of the invention and what I claim as new and desire to secure by Letters Patent I shall express in the following claims.

Claims:

1. A hub comprising outer and inner sleeves, bearings interposed between them and a tongue struck from said inner sleeve to bear resiliently and frictionally on the axle.

2. A hub comprising outer and inner sleeves, bearings interposed between them and yielding means carried by the inner sleeve adapted to bind on the axle when inserted in the sleeve whereby the latter will be non-rotatably held to the former.

3. A hub having anti-friction bearings and provided with an inner sleeve of a size to slip freely over its supporting axle and having also a device to be engaged with retaining means on the axle and spring means presented to the axle at the interior of the sleeve to be displaced outwardly thereby and bind thereagainst.

In testimony whereof, I have signed my name to this specification.

WILLIAM A. DEAN.